United States Patent [19]

Sawada et al.

[11] Patent Number: 4,998,907

[45] Date of Patent: Mar. 12, 1991

[54] CONNECTING PIN AND METHOD USING THE CONNECTING PIN

[75] Inventors: Keiichi Sawada, Osaka; Masashi Nagano, Izumi, both of Japan

[73] Assignee: Shimano Industrial Company Limited, Osaka, Japan

[21] Appl. No.: 471,782

[22] Filed: Jan. 29, 1990

[30] Foreign Application Priority Data

Jan. 30, 1989 [JP] Japan ................................ 1-10039[U]

[51] Int. Cl.⁵ .............................................. F16G 5/18
[52] U.S. Cl. .................................... 474/206; 474/234
[58] Field of Search ........ 474/206, 211, 212, 226–228, 474/230–234

[56] References Cited

U.S. PATENT DOCUMENTS

| | | | |
|---|---|---|---|
| 4,220,052 | 9/1980 | Sheldon | 474/234 X |
| 4,494,945 | 1/1985 | Ogino | 474/206 X |
| 4,610,647 | 9/1986 | Weeds | 474/206 |
| 4,886,485 | 12/1989 | Bartoletto | 474/234 X |

Primary Examiner—Thuy M. Bui

[57] ABSTRACT

A connecting pin for use in a bicycle chain for example. The connecting pin has a pin body for connecting a plurality of connecting members at least one of which defines a through hole, an inserting portion attached to a longitudinal end the pin body, the inserting portion having a tapered portion insertible into and retainable at the through hole and a detachable connecting portion provided between the pin body and the inserting portion for detachably connecting the same. A connecting method using the connecting pin is also disclosed.

10 Claims, 2 Drawing Sheets

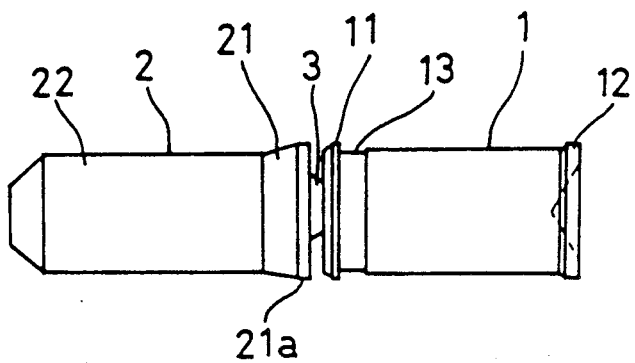
FIG. 1
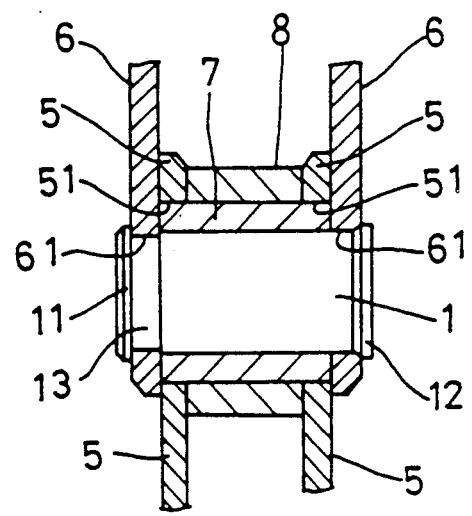
FIG. 2
FIG. 3
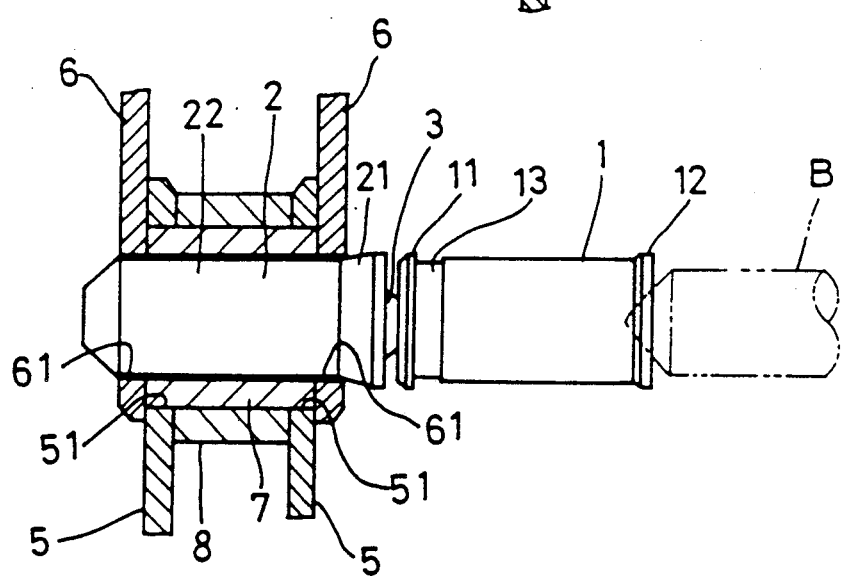

CONNECTING PIN AND METHOD USING THE CONNECTING PIN

BACKGROUND OF THE INVENTION

1. Field of the Invention

The present invention relates to a connecting pin for connecting elements of e.g. a chain and also a connecting method using the connecting pin.

2. Description of the Related Art

A chain such as a drive chain for use in a bicycle for operatively connecting a front gear attached to a crank shaft and a rear hub includes, as its connecting elements, a pair of inner plates each defining pin hole at opposed ends thereof and a pair of outer plates each defining corresponding pin holes at opposed ends thereof. These inner and outer plate are overlapped at their ends so as to align the respective corresponding pin holes with each other. Then, a connecting pin is forcibly inserted into the common pin hole defined by the overlapped inner and outer plate. As a plurality of inner and outer plates are connected in series with each other, there is formed one chain loop.

On some occasions e.g. for entraining the chain on a particular or different combination of a front gear and a rear gear or for eliminating unnecessary looseness of the chain which may occur through an extended period of use, the chain length must be adjusted. For such chain length adjustment, one or plurality of connecting pins (the number depends on the amount of adjustment needed) are completely withdrawn from the pin holes of the respective plates of the chain by using a pin attaching-detaching device so as to detach the corresponding plates. The, the inner plates and the outer plates at the free ends of the disconnected chain are again overlapped with each other in the manner described above and are connected by forcibly inserting the pin into the pin hole to form a new chain loop. The disconnecting operation of the chain can be alterantely effected without the complete withdrawal of the connecting pin. In this case, the pin is not completely withdrawn from the connecting hole of the plates but is withdrawn just enough to permit detachment of the plates, such that one longitudinal end of the pin is retained at the pin hole of the outer or inner plate to be maintained. With completion of a plate detaching operation, the pin which one end is retained at the hole of the outer (inner) plate is pushed, by its opposite ends, into a hole of the new inner (outer) plate to form a new complete chain loop. A chain length adjustment for increasing the chain length can be effected in substantially the same manner as described above.

The pin attaching-detaching device used in the above operations, as illustrated in FIG. 5, includes a base member A, a control rod C attached in the base member A through a threaded engagement, the rod C having a pin push shaft B at a terminal end thereof, and a chain receiving portion E defining a receiving hole D for receiving the pin push shaft B. In operation, an outer face of an outer plate pair to be disconnected form the chain is fitted to an end face of the chain receiving portion E. In this condition, the control rod C is operated, i.e. rotated to cause a leading end of the pin push shaft B to come into contact with an end face of the connecting pin. As the rod C is further rotated, the push shaft B pushes the connecting pin out of the pin hole of the outer plate pair and the inner plate pair aligned therewith. With completion of necessary chain length adjustment as described above, the withdrawn (completely or partialy withdrawn) pin is again used for connecting a new pair of inner and outer plates.

However, if the chain length adjustment is carried out by using the above-described pin attaching-detaching device without complete withdrawal of the connecting pin, an operator feels it very difficult to determine the withdrawal amount of the pin just enough for plate detachment.

Further, since the pin push shaft B moves into the pin hole from which the pin has been withdrawn, the operator can know whether or not the pin has been withdrawn by a proper amount for the plate detachment only after releasing the control rod therefrom. For this reason, an inexperienced operator often has to repeat the operation in a trial and error manner. With either complete or partial withdrawal of the connecting pin, the chain connecting operation after the chain length adjustment has been very troublesome and time-consuming.

Moreover, when the pin is withdrawn form the pin hole, this withdrawal motion can damage the pin through the friction associated therewith. Accordingly, even if the pin can be successfully inserted into the hole again, the damaged pin may not be retained at the pin hole properly or sufficiently, and an inadvertent pin detachment tends to occur after the chain length adjustment.

The present invention attends to the above drawbacks of the prior art. And, the primary object of the invention is to provide an improved connecting pin and connecting method using this pin which permits easier pin connecting operation and more reliable connection after the operation.

SUMMARY OF THE INVENTION

For accomplishing the above-noted object, a connecting pin related to the present invention comprises: a pin body for connecting a plurality of connecting members at least one of which defines a through hole; an inserting portion attached to a longitudinal end of the pin body, the inserting portion having a tapered portion insertible into and retainable at the through hole; and a detachable connecting portion provided between the pin body and the inserting portion for detachably connecting the same.

The invention also relates to a connecting method using the above-described connecting pin.

Functions and effects of the above construction will be described next.

For interconnecting a plurality of connecting members each defining a through hole, for e.g. connecting free ends of a disconnected chain by overlapping the inner and outer plates of the chain ends, as the inserting portion is inserted into the pin (i.e. through) hole of the overlapped plates, this inserting portion can be reliably retained within the hole. Then, under this condition, as the terminal face of the pin body is pressed by an appropriate tool, the pin body can be readily inserted into the hole as being guided by the tapered portion of the inserting portion. After complete insertion of the pin body, the inserting portion, which now projects from the chain plates, can be removed, i.e. detached from the pin body at the detachable connecting portion by applying a shearing force thereto. With this, the chain connecting operation completes. Unlike the prior art, the once withdrawn pin is not used again. Therefore, the problem of inadvertent pin detachment or loose connection due to the damage of the pin can be advantageouly avoided.

Further and other objects, features and effects of the invention will become apparent from the following more detailed description of the embodiments of the invention with reference to the accompanying drawings.

BRIEF DESCRIPTION OF THE DRAWINGS

Accompanying drawings FIGS. 1 through 5 illustrates a preferred embodiment of the present invention; in which, FIG. 1 is a front view of a connecting pin of the invention, FIG. 2 is a section view of major portions in which a pair of inner plates and a pair of outer plates of a chain are connected with each other through an overlapped arrangement, FIG. 3 is a section view of the major portions in which an inserting portion of the connecting pin is forcibly inserted into a through hole of the overlapped inner and outer plates, FIG. 4 is a section view of the major portions in which a pin body of the connecting pin is fitted in the through hole, and FIG. 5 is a view illustrating a connecting operation of a chain using the connecting pin of the invention and a pin attaching-detaching device.

DESCRIPTION OF THE PREFERRED EMBODIMENTS

Figure 4:
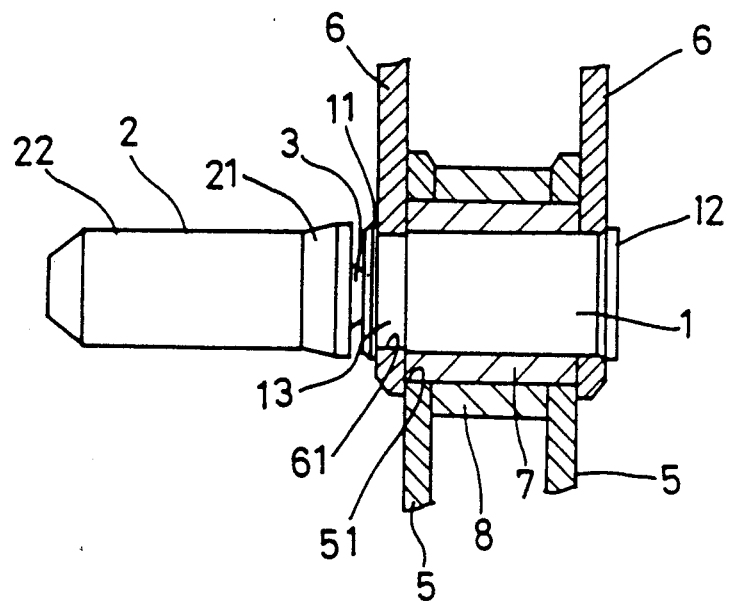

A connecting pin and a connecting method using the connecting pin relating to the present invention will be particularly described with reference to accompanying drawings by way of example where the pin and the method are used for a drive chain of a bicycle entrained between a front gear and a rear gear.

The illustrated chain includes a pair of inner plates 5, 5 each defining pin holes 51, 51 at opposed ends thereof, a pair of outer plates 6, 6 each defining pin holes 61, 61 corresponding to the holes 51, 51 at opposed ends thereof, a cylindrical bush 7 fitted in the pin holes 51, 51 of the inner plates 5, 5 for setting an interdistance between these plates 5, 5, and a roller 8 rotatably fitted on an outer periphery of the busy 7. Inner end faces of the outer plates 6, 6 are overlapped on outer end faces of the inner plates 5, 5 with the respective pin holes 61 being aligned with side openings of the bush 7. Then, the invention's connecting pin is inserted through the pin holes 61 and the opposite side openings of the bush 7 aligned with the holes 61 so as to connect the inner plates 5, 5 and the outer plates 6, 6 with each other. A plurality of (i.e. a looped series of) this connection constitute the bicycle drive chain.

In one preferred embodiment of the present invention illustrated in FIG. 1, the connecting pin includes a pin body 1, an inserting portion 2 and a detachable connecting portion 3 positioned between the pin body 1 and the inserting portion 2, the connecting portion 3 having a smaller diameter than the pin body 1 and the inserting portion 2. The pin body 1 is actually used for the connection between the inner plate pair 5 and the outer plate pair 6 as the body 2 is forcibly inserted through the pin hole 61 of one outer plate 6, the inner cylindrical hole of the hollow bush 7 and then through the pin hole 61 of the other outer plate 6 of the pair. Further, one terminal end of this pin body 1 is intergrally connected via the detachable connecting portion 3 with the inserting portion 2 having a tapered portion 21 adjacent the connecting portion 3. The inserting portion 2 is forcibly insertible into and frictionally retainable at the pin holes 61 and the inner hole of the bush 7 communicating therewith.

More particularly, the pin body 1 has a diameter slightly larger than that of the pin hole 61 and has a length slightly greater than an interdistance between the pair of outer plates 6 and 6. Further, the pin body 1 has a pair of flanges 11 and 12 at opposite longitudinal ends thereof for preventing the pi body 1 from inadvertently slipping out of the pin holes 61, 61.

In the above construction, it is also conceivable to form an annular recess 13 at a portion of the pin body 1 more inside than the flange 11, the recess 13 being formed as a shallow dip relative to the outer periphery of the pin body 1 and having a width equal to the thickness of the outer plate 6. With this arrangement, as the pin body 1 is forcible inserted into the pin hole 61, the peripheral edge of the pin hole 61, by its elastic resilience against the forcible insertion of the pin body 1, snaps into the annular recess 13. This is advantageous for further reliably preventing inadvertent withdrawal of the pin body 1 from the pin holes 61.

The inserting portion 2 consists essentially of the tapered portion 21 substantially continuous with the flange 11 through a peripheral face having a diameter equal to the flange 11 and larger than the pin hole 61 and of a longitudinal straight portion 22 having a diameter smaller than the pin hole 61 and the bush hole. When this longitudoinal straight portion 22 is inserted through the pin hole 61 of the one outer plate 6, the hole of the bush 7 and then through the pin hole 61 of the other outer plate 6, the tapered portion 21 comes into frictional contact with the peripheral edge of the pin hole 61 of the former outer plate 61 and the inserting portion 2 is retained in this condition. In the above forcible inserting operation, the tapered portion 21 causes elastic deformation, i.e. diameter increase of the pin hole 61.

The detachable connecting portion 3 is formed by annually cutting an intermediate peripheral portion of the connecting pin between the flange 11 and the tapered portion 21. Thus, the detachable connecting portion 3 has a reduced diameter relative to the pin body 1 so that the portion 3 can be easily detached from the body 1 by applying shearing force to the inserting portion 2.

Moreover, the detachable connecting portion 3 has a length shorter than the thickness of the outer plate 6 of the chain so as to faciliate the insertion of the inserting portion 2 into the pin hole 61.

The detachable connecting portion 3 can have a rectangular or V-notch like cross section in place of the circular one described above. Thus, the cross sectional shape of the detachable connecting portion can very conveniently. Also, this connecting portion 3 can be formed by any convenient method such as forging or plastic deformation using a press machine, other than the cutting method described above.

Moreover, it is not essential for the detachable connecting portion 3 to have a reduced diameter than the pin body or the inserting portion. For, even if the connecting portion 3 has the same diameter as the pin body and the inserting portion, such easily detachable arrangement can also be achieved by means of adhesive which permits easy detachment of the inserting portion 2 after the chain connecting operation. Further alternately, the detachable; connection can be achieved also by a threaded engagement between the pin body and the inserting portion. That is, what is referred to as the detachable connecting portion in this invention should be understood as to cover all these detachable connecting means.

The chain connecting operation using the connecting pin having the above-described construction will be more particularly described next.

Figure 5:
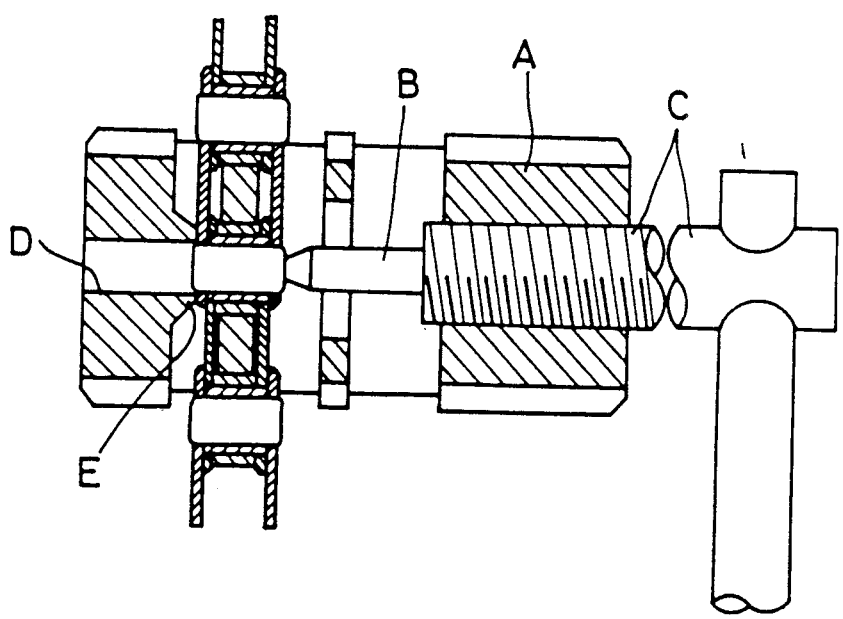

First, for connecting free ends of a disconnected chain, the inner end faces of the outer plates 6, 6 are overlapped on the outer end faces of the inner plates 5, 5, with the pin holes 61 and the hole of the bush 7 being aligned with each other. In this condition, the inserting portion 2 is inserted through the one pin hole 61, the bush hole and then the other pin hole 61, whereby the inserting portion 2 can be frictionally retained in the pin holes 61. Thereafter, the free end face of the pin body 1 is pushed by means of the control rod C of the pin attaching-detaching device which has been described hereinbefore with reference to FIG. 5. With this pushing operation, the tapered portion 21 of the inserting portion 2 gradually enlarged the periphery of the pin holes 61 to allow easy insertion of the pin body 1 subsequent thereto. The inserting operation is continued until the inserting movement is stopped as the flange 12 formed at the terminal end of the pin body 1 comes into abutment against the outer peripheral edge of the outer pate 6. Next, the pin attaching-detaching device is removed from the chain. In this condition, the inserting portion 2 substantially entirely projects out of the pin holes 61. Then, this projecting inserting portion 2 is fitted into the receiving hole D of the pin attaching-detaching device and the device is wrenched relative to the chain, the detachable connecting portion 3 is sheared way from the pin body 1.

According to the above described connecting pin and the method using this pin of the present invention, the inserting operation of the pin body 1 into the pin holes 62 can be carried out while the inserting portion 2 is inserted into and frictionally retained at the pin holes 61. Therefore, the inserting operation can be effected very easily and efficiently.

Further, the pin body 1 has the flanges 11 and 12 at the opposite ends thereof. Thus, once the pin body 1 is fitted in the pin holes 61, the pin body 1 will not easily slip out of the pin holes 61. Moreover if the annular recess 13 is formed at one end portion of the pin body 1 so that the peripheral edge of the pin holes 61 may be snapped into the recess 13, the pin body 1 can be more reliably retained in the pin holes 61.

It is to be noted that the flanges 11, 12 and the annular recess 13 of the pin body 1 do not constitute the essential parts of the invention and therefore these elements can be eliminated according to the necessity and convenience.

In the foregoing embodiment, the inserting portion 2 is formed with the tapered portion 21 and the longitudinal straight portion 22. Instead, this inserting portion 2 can have a different configuration. For instance, it is conceivable to form the entire inserting portion 2 with a tapered shape. Also, the length of this inserting portion 2 is not limited to the one described in the foregoing embodiment.

The foregoing embodiment has been described by way of the bicycle drive chain. However, it is to be understood that the connecting pin and the connecting method of the present invention can be used in many other applications for connecting various elements having through holes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which comes within the meaning and range of equivalency of the claims are therefore intended to be embraced therein.

What is claimed is:

1. A connecting pin comprising:
    a pin body for connecting a plurality of connecting members at least one of which defines a through hole;
    an inserting portion attached to a longitudinal end of said pin body, said inserting portion having a tapered portion insertible into and retainable at said through hole; and
    a detachable connecting portion provided between said pin body and said inserting portion for detachably connecting the same.

2. A connecting pin as defined in claim 1, wherein each of said connecting members is a chain forming member having a pair of inner plates defining pin holes at opposed ends thereof and a pair of outer plates defining pin holes at opposed ends thereof and corresponding to the pin holes of said inner plates.

3. A connecting pin as defined in claim 1 or 2, wherein said inserting portion, said detachable connecting portion and said pin body are formed integrally with one another.

4. A connecting pin as defined in claim 3, wherein said detachable connecting portion has a reduced diamter relative to said pin body and said inserting portion.

5. A connecting pin as defined in claim 4, wherein said detachable connecting portion has a length shorter than a plate thickness of said outer plate.

6. A connecting pin as defined in claim 3, wherein said inserting portion further includes a longitudinal straight portion subsequent to said taperd face.

7. A connecting pin as defined in claim 1 or 2, wherein said pin body includes a pair of flanges at opposed ends thereof.

8. A connecting pin as defined in claim 7, wherein said pin body includes a recess at least at one end portion thereof.

9. A connecting method using a connecting pin as defined in claim 1, comprising the steps of:
    inserting the connecting pin into the through holes of the overlapped connecting members from said inserting portion;
    continuously inserting said pin body into the through holes of the overlapped connecting members; and
    detaching said inserting portion from said pin body at said detachable connecting portion.

10. A method as defined in claim 9, wherein each of said connecting members is a chain forming member having a pair of inner plates defining pin holes at opposed ends thereof and a pair of outer plates defining pin holes at opposed ends thereof and corresponding to the pin holes of said inner plates.

* * * * *